US005873507A

United States Patent [19]

Suzuki

[11] Patent Number: 5,873,507

[45] Date of Patent: Feb. 23, 1999

[54] TOP OF FORM SETTING APPARATUS FOR A PRINTER

[75] Inventor: Kanji Suzuki, Shizuoka, Japan

[73] Assignee: Star Micronics Co., Ltd., Shizuoka, Japan

[21] Appl. No.: 853,902

[22] Filed: May 9, 1997

[30] Foreign Application Priority Data

May 17, 1996 [JP] Japan .................................... 8-148096

[51] Int. Cl.[6] ........................... B23Q 15/00; B65H 20/00; B41J 13/26

[52] U.S. Cl. ............................. 226/43; 226/143; 400/630

[58] Field of Search ..................... 226/143, 43; 400/630, 400/577, 708

[56] References Cited

U.S. PATENT DOCUMENTS

| | | | |
|---|---|---|---|
| 5,062,726 | 11/1991 | Inomata et al. | 400/630 |
| 5,200,790 | 4/1993 | Irie et al. | 226/143 X |
| 5,215,383 | 6/1993 | Hilton | 226/143 X |
| 5,244,293 | 9/1993 | Judger et al. | 226/143 X |
| 5,259,544 | 11/1993 | Hashimoto | 226/43 |
| 5,335,837 | 8/1994 | Saeki et al. | 400/708 X |
| 5,427,462 | 6/1995 | Jackson et al. | 400/630 X |
| 5,466,079 | 11/1995 | Quintana | 400/630 X |
| 5,624,196 | 4/1997 | Jackson et al. | 400/625 |

FOREIGN PATENT DOCUMENTS

| | | |
|---|---|---|
| 60-76373 | 4/1985 | Japan . |
| 61-205160 | 9/1986 | Japan . |
| 3-253371 | 11/1991 | Japan . |
| 4-129762 | 4/1992 | Japan . |

*Primary Examiner*—Michael Mansen
*Attorney, Agent, or Firm*—Whitham, Curtis & Whitham

[57] ABSTRACT

A top of form setting apparatus for a printer, which has a printing device for printing on paper, a paper storage for storing the paper, a paper feeding device for feeding the paper in a forward direction toward the printing device and in a reverse direction toward the paper storage, a controller for controlling the printing device and the paper feeding device, a paper top detector for detecting a top of the paper fed by the paper feeding device, a paper reverse feeding device for reversely feeding the paper which has been set at a printing position until reaching a detecting position of the paper top detector, and further for reversely feeding the paper by a predetermined amount, and a paper forward feeding device for forwardly feeding the paper which has been fed in a reverse direction by the paper reverse feeding device until reaching the detecting position of the paper top detector, and further for forwardly feeding the paper by a predetermined amount, thereby setting the paper top at a predetermined position.

34 Claims, 17 Drawing Sheets

TOP OF FORM SETTING APPARATUS FOR A PRINTER

BACKGROUND OF THE INVENTION

1. Field of the Invention

The present invention relates to a top of form setting apparatus for a printer, in regard to a printer which carries out the printing on a continuous form of paper such as a series of vouchers, and, more particularly, to an apparatus for a printer which is sure to set the top of form of paper at a predetermined position, through amendment of position when an operator mistakenly set the paper at an inaccurate position.

2. Description of the Related Art

When a printer carries out the printing on a continuous form of paper, such as a series of vouchers, the top of continuous form of paper is manually set at a predetermined position by an operator, which is illustrated in FIG. 18 as an example of the prior art. There is a printer 201, in which a paper feeding means and a printing means are mounted. A paper holder unit 203 is mounted on the outside of the printer 201 (on the left side in FIG. 18). The paper holder unit 203 consists of a paper holder 205 and a holder cover 207, in which, paper 209 is stored. The paper 209 is a continuous form, such as a series of vouchers, and it can be cut into a separate form at the perforation.

A case 211 of the printer 201 is provided with a paper inlet. Although there is no illustration in FIG. 18, the paper inlet is positioned at the left side of the case 211 in FIG. 18. The case 211 is further provided with a paper outlet 213 at the top thereof so that the printed paper 209 can be output. There is a knob 215 on the side of the case 211 in FIG. 18. The knob 215 is used for a manually-operated mechanism mounted in the printer 201, and when an operator rotates the knob 215, the paper feeding means mounted in the case 211 can be actuated by such a manually-operated mechanism.

With such a structure, when the top of the paper 209 is set at a predetermined position through manual operation, an operator 217 firstly holds the top of the paper 209 in one hand, inserts the paper 209 into the case 211 via the paper inlet, and puts the top of the paper 209 on the paper feeding means. The operator 217 then rotates the knob 215 in the other hand, and drives the paper 209 until the top of the paper 209 reaches the predetermined position. In this case, for example, there may be any mark in the vicinity of the paper outlet 213 of the case 211, so that the operator 217 can visibly confirm that the top of the paper 209 is set at the predetermined position when the top of the paper 209 reaches such a mark.

However, the manual operation by the operator 217, as above described, is very complicated and troublesome. Consequently, there are provided apparatuses which automatically set the top of paper 209 at a predetermined position. Such apparatuses are disclosed in Japanese Unexamined Patent Publication Nos. Sho 60-76373 and 61-205160.

With regard to the apparatus for automatic setting of top of paper disclosed in the Japanese Unexamined Patent Publication No. Sho 60-76373, the operator 217 (hereinafter the same reference numerals, such as the operator "217", are given to those in the Japanese Unexamined Patent Publication Nos. Sho 60-76373 and 61-205160 for easy reference) firstly inserts the paper 209 into the case 211 and puts the top of the paper 209 on the paper feeding means. The operator 217 then operates a top of form switch. Through operation of the top of form switch, the paper 209 is automatically fed by the paper feeding means. Then the top of the paper 209 is detected by a paper top detecting sensor. The paper 209 is fed by a predetermined amount after detection of the top of the paper 209, until the top of the paper 209 reaches the predetermined position.

With regard to the apparatus for automatic setting of top of paper disclosed in the Japanese Unexamined Patent Publication No. Sho 61-205160, there is a marking provided in advance on the paper 209. The inserted paper 209 is automatically fed, for example, by the paper feeding means through operation of the top of form switch. There is a sensor provided in the apparatus, and the paper 209 is fed to the position at which the sensor detects the marking on the paper 209 in order to position the paper 209 at the predetermined position.

However, the prior art discussed above has the following problems:

Firstly, with regard to the apparatus for automatic setting of top of paper in Japanese Unexamined Patent Publication No. Sho 61-205160, it is necessary to put the marking in advance on the paper 209. Therefore the paper for universal use cannot be utilized, and instead, only the special paper with the marking can be used, which leads to increase in the cost.

Secondly, with regard to either of the apparatuses for automatic setting of top of paper, in Japanese Unexamined Patent Publication No. Sho 60-76373 or No. Sho 61-205160, there may be a case that the paper 209 deviates from the accurate position due to operation of the operator 217.

As above discussed, the operator 217 inserts the paper 209 into the case 211, and puts the top of the paper 209 on the paper feeding means. After that, the paper 209 is automatically fed by the paper feeding means. However, as shown in FIG. 19, during the automatic paper feeding, when the operator 217 holds the paper 209, or when the operator 217 pulls the paper 209 in the opposite direction of paper feeding, the paper feeding by the predetermined amount will not be carried out, which results in the deviation of position of the paper 209.

When the operator 217 obliquely inserts the paper 209 into the case 211 by mistake and puts the paper 209 on the paper feeding means, the paper feeding means automatically feeds the paper 209 without any amendment of such an oblique position, which may sometimes result in the state such as jamming of paper.

With regard to either of the apparatuses for automatic setting of top of paper, in Japanese Unexamined Patent Publication No. Sho 60-76373 or No. Sho 61-205160, when the top of the paper 209 is set at the predetermined position, printing is done, and the printed paper 209 is cut and output, then the printing position of the following paper 209 is set subject to the state of the former printing of the paper 209. At that time, as shown in FIGS. 20 and 21, when the operator 217 cuts the printed paper 209 by using the tearing bar which is positioned at the paper outlet 213 in order to cut the paper, there may be a case that the operator 217 pulls the following paper 209, which results in the positioning of the following paper 209 in a deviated state.

In addition, as shown in FIG. 22, there may be a case that the operator 217 operates the knob 215 by mistake, which also results in the positioning of the following paper 209 in a deviated state.

In general, the form such as a voucher has been "preprinted", in which the printing positions thereof have already been specified. Therefore, if the paper 209 is set in a deviated state, the necessary information is not printed in the accurate position. Such printings in inaccurate positions may cause serious errors. For example, when the statement of credit card is issued, the amount of bill will not be printed in the corresponding box (position) which indicates such an amount, and instead, the amount will be printed in any other box (position) which should correspond to any other indication.

SUMMARY OF THE INVENTION

It is an object of the present invention to provide a top of form setting apparatus for a printer, which requires no complicated or troublesome operation in setting the top of form at a predetermined position, and which is sure to set the top of form of paper at an accurate position, through amendment of position when an operator mistakenly set the paper at an inaccurate position.

To achieve the object mentioned above, according to the present invention, there is provided a top of form setting apparatus for a printer, which has a printing means for printing on paper, a paper storage for storing the paper, a paper feeding means for feeding the paper in a forward direction toward the printing means and in a reverse direction toward the paper storage, a controlling means for controlling the printing means and the paper feeding means, a paper top detecting means for detecting a top of the paper fed by the paper feeding means, a paper reverse feeding means for reversely feeding the paper which has been set at a printing position until reaching a detecting position of the paper top detecting means, and further for reversely feeding the paper by a predetermined amount, and a paper forward feeding means for forwardly feeding the paper which has been fed in a reverse direction by the paper reverse feeding means until reaching the detecting position of the paper top detecting means, and further for forwardly feeding the paper by a predetermined amount, thereby setting the paper top at a predetermined position.

Preferably, the apparatus may be provided with a judging means for concluding a top of form set error when detection of the paper by the paper top detecting means is not released in spite that enough amount of reverse feeding has been executed by the paper reverse feeding means so as to pass the detecting position.

Preferably, the predetermined amount during paper feeding in a reverse direction by the paper reverse feeding means may be an enough amount which can absorb backlash of a gear train of the paper feeding means.

Alternatively, there is provided a top of form setting apparatus for a printer, which has a printing means for printing on paper, a paper storage for storing the paper, a paper feeding means for feeding the paper in a forward direction toward the printing means and in a reverse direction toward the paper storage, a controlling means for controlling the printing means and the paper feeding means, a paper top detecting means for detecting a top of the paper fed by the paper feeding means, a first paper forward feeding means for forwardly feeding the paper until reaching a detecting position of the paper top detecting means, and further for forwardly feeding the paper by a predetermined amount, thereby setting the paper at a printing position, a paper reverse feeding means for reversely feeding the paper which has been fed in a forward direction by the first paper forward feeding means until reaching the detecting position of the paper top detecting means, and further for reversely feeding the paper by a predetermined amount, and a second paper forward feeding means for forwardly feeding the paper which has been fed in a reverse direction by the paper reverse feeding means until reaching the detecting position of the paper top detecting means, and further for forwardly feeding the paper by a predetermined amount, thereby setting the paper top at a predetermined position.

Preferably, the apparatus may be provided with a judging means for concluding a top of form set error when detection of the paper by the paper top detecting means is not released in spite that enough amount of reverse feeding has be en executed by the paper reverse feeding means so as to pass the detecting position.

Preferably, the predetermined amount during paper feeding in a reverse direction by the paper reverse feeding means may be an enough amount which can absorb backlash of a gear train of the paper feeding means.

Preferably, the apparatus may be provided with a judging means for concluding a paper set error when the paper top detecting means does detect the top of the paper in spite that enough amount of forward feeding has been executed by the first paper forward feeding means so as to reach the detecting position.

Preferably, the predetermined amount during paper feeding in a forward direction by the first paper forward feeding means may be an enough amount so that an operator can visibly confirm the paper.

With this structure, in setting paper, or in printing on the following form of paper, the accurate setting of the top of paper is surely carried out at a predetermined position without being affected by any wrong operation by the operator and without troublesome operation, thus the quality of printing may improve.

Further, in setting paper, the operator can be warned if the operator holds the paper or pulls the paper in the direction opposite to the paper feeding. Further, the operator can also visibly confirm the jamming of paper, when the operator obliquely inserts the paper by mistake, and puts the paper on the paper feeding means in such an oblique state.

Further, during paper feeding in the reverse direction, the paper feeding in the reverse direction is carried out by an amount by which the backlash, of the gear train which serves as the rotation transmission mechanism, can be absorbed, and hence, there is no possibility that the deviation of position occurs due to backlash of the gear train.

BRIEF DESCRIPTION OF THE DRAWINGS

The invention will be described below in detail with reference to the accompanying drawings, in which.

DETAILED DESCRIPTION OF THE PREFERRED EMBODIMENT

Figure 1:
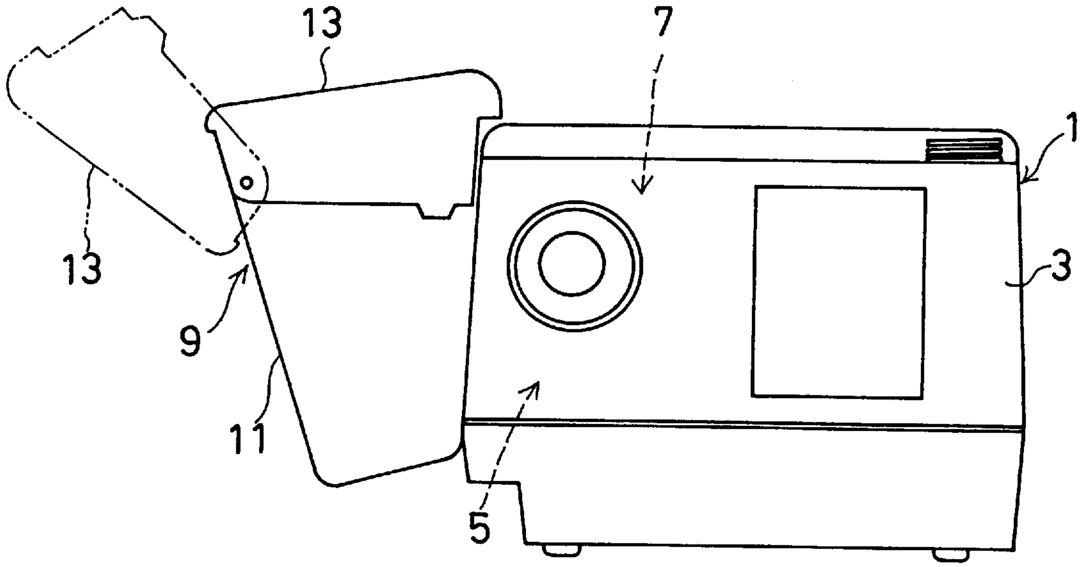
FIG. 1 is an elevational view of a printer according to an embodiment of the present invention.
Figure 2:
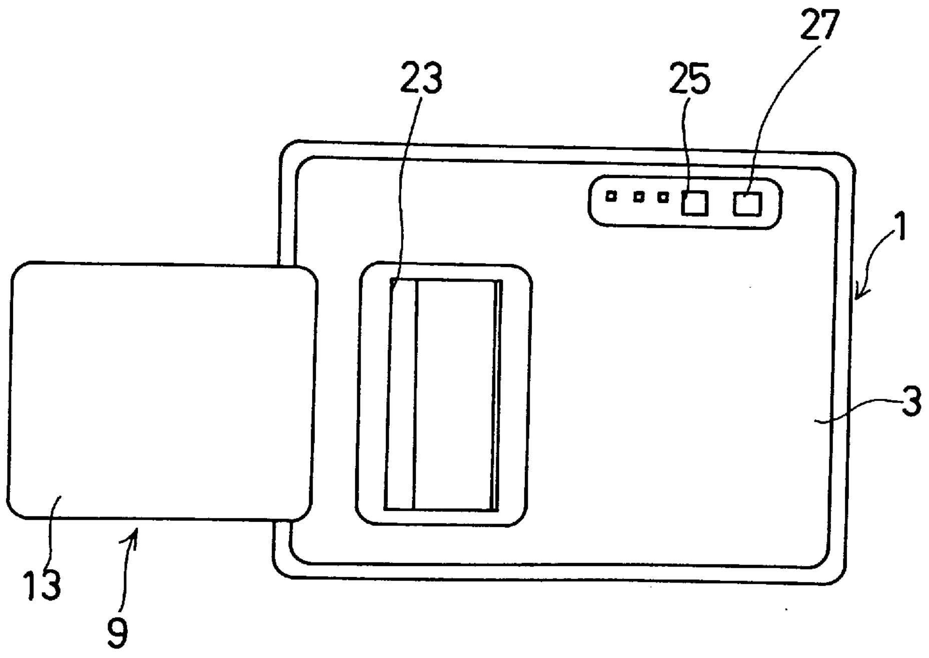
FIG. 2 is a plan view of a printer according to the embodiment of the present invention.
Figure 3:
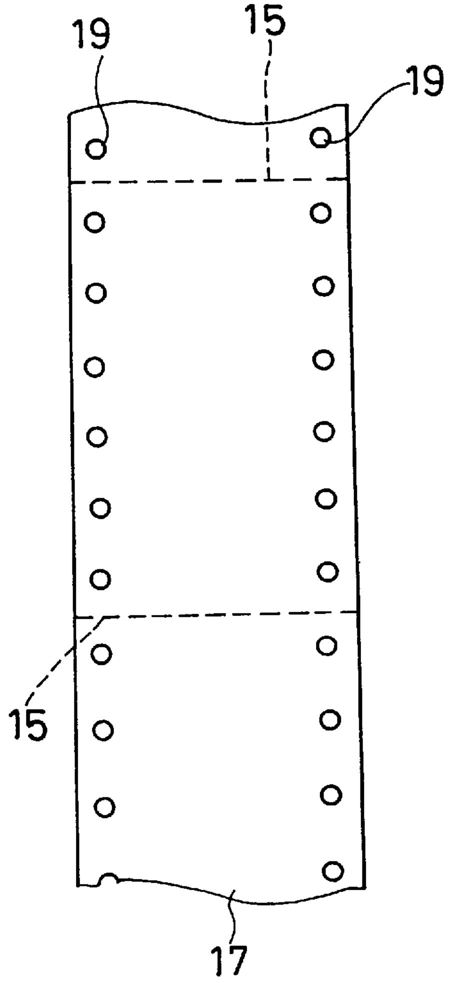
FIG. 3 is a plan view of paper according to the embodiment of the present invention.

An embodiment of the present invention will now be described in detail with reference to FIGS. 1 through 17. Firstly, the external structure of a printer is discussed. As illustrated in FIGS. 1 and 2, there is a printer 1 which is provided with a case 3. A paper feeding means 5, and a printing means 7, which will be described afterwards, are contained in the case 3. A detachable paper holder unit 9 is attached to the left side of the case 3 as shown in FIG. 1. The paper holder unit 9 consists of a paper holder 11 and a holder cover 13, and the paper holder 11 stores paper 17. The paper 17 is a continuous form like a series of vouchers, with perforations 15 as illustrated in FIG. 3. The paper 17 also has a series of holes 19, with predetermined regular spaces between the holes 19, positioned at both sides of the paper 17, which will be discussed afterwards in relation to the paper feeding means 5.

The holder cover 13 is rotatively mounted on the paper holder 11, so that the holder cover 13 can pivot, as shown in FIG. 1, from the position drawn in a continuous line to the position in a chain double-dashed line (virtual line). With this structure, the paper holder unit 9 can be opened or closed.

Figure 5:
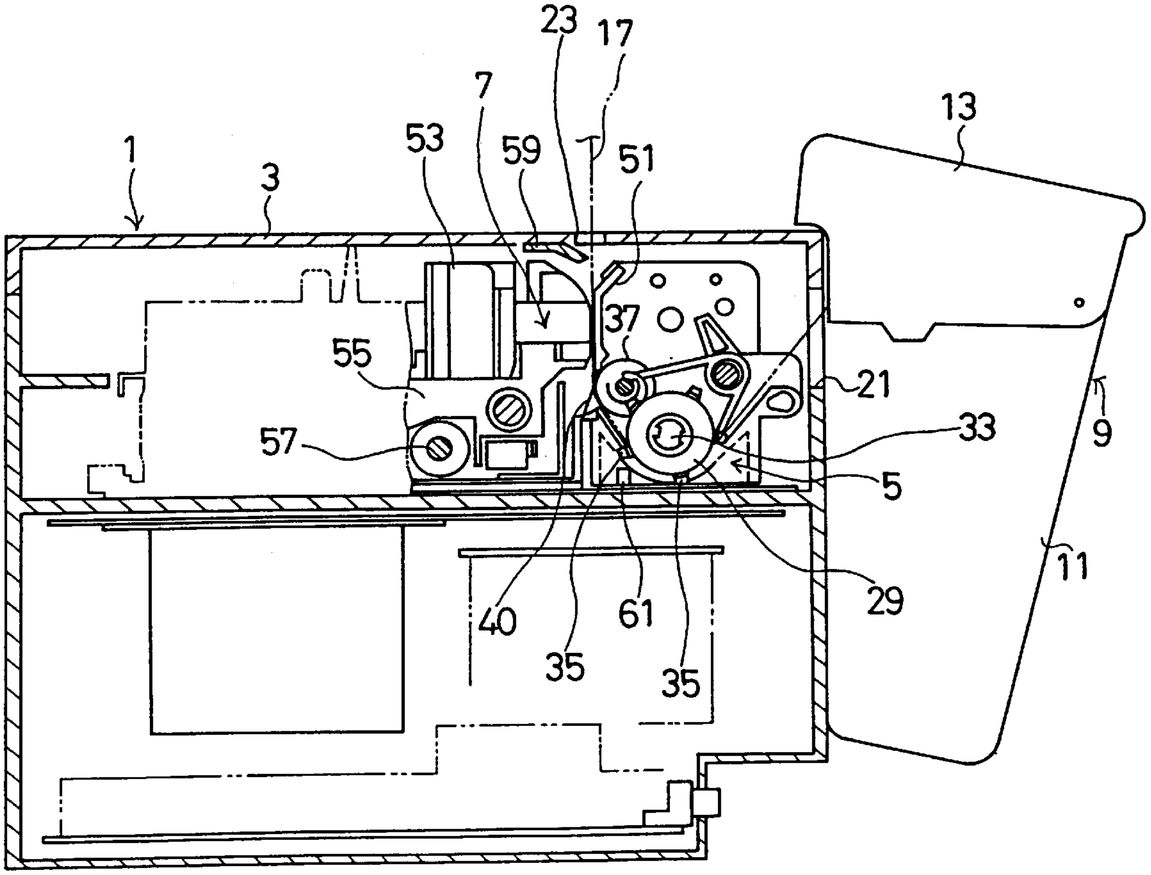
FIG. 5 is a cross-sectional view showing a structure of a paper feeding means and a printing means of a printer according to the embodiment of the present invention.
Figure 6:
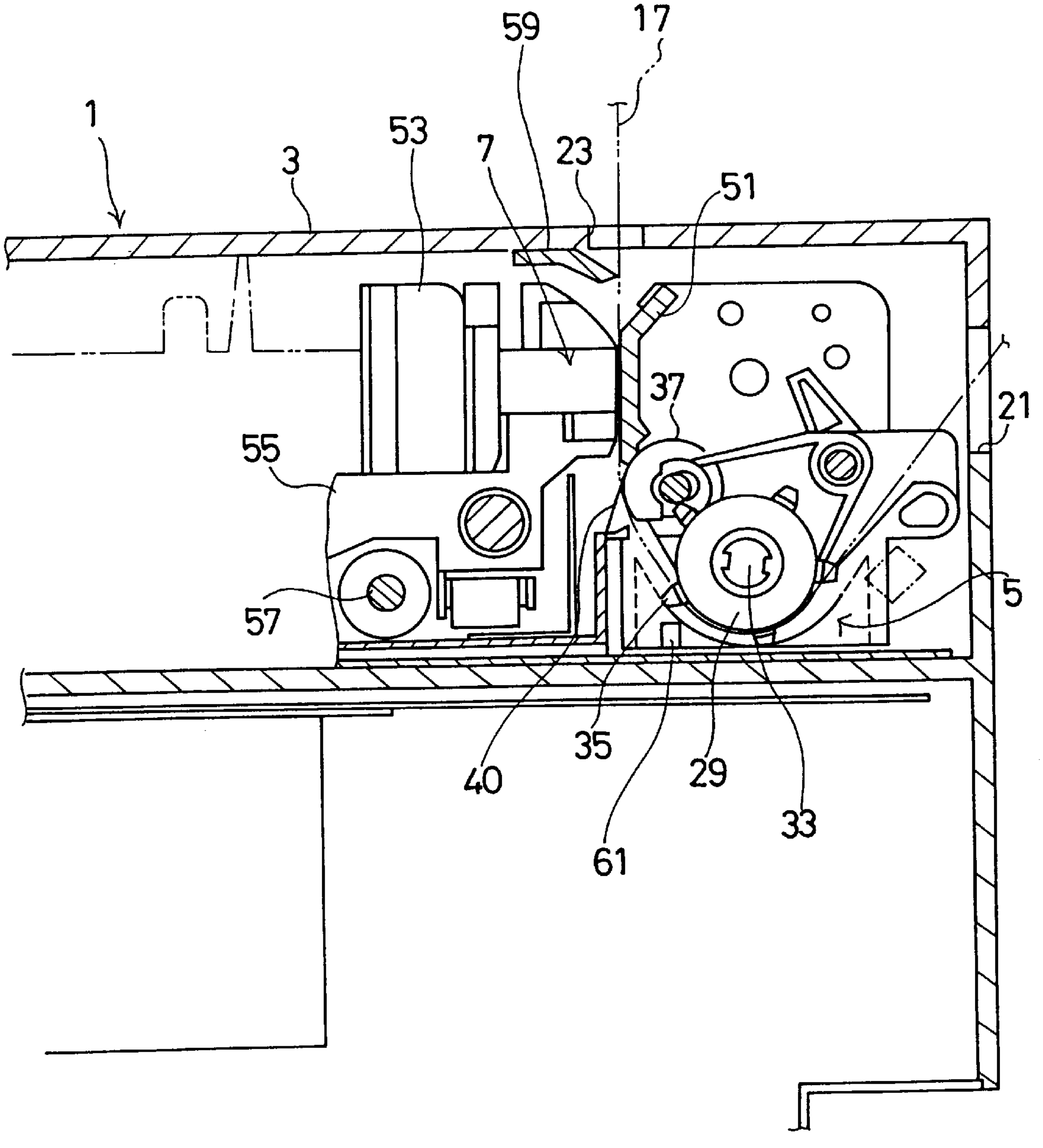
FIG. 6 is a developed cross-sectional view showing a part of the structure of FIG. 5 according to the embodiment of the present invention.

As illustrated in FIG. 5, there is a paper inlet 21 which introduces the paper 17, formed on the wall on the side of the paper holder unit 9 of the case 3. There is also a paper outlet 23 which outputs the printed paper 17, on the top of the case 3, as illustrated in FIGS. 2, 5 and 6. Provided respectively at one end of the top of the case 3, as illustrated in FIG. 2, is a pair of paper feeding switches 25 and 27. The paper feeding switch 25 is used for forward feeding, and the other paper feeding switch 27 is used for reverse feeding.

Figure 4:
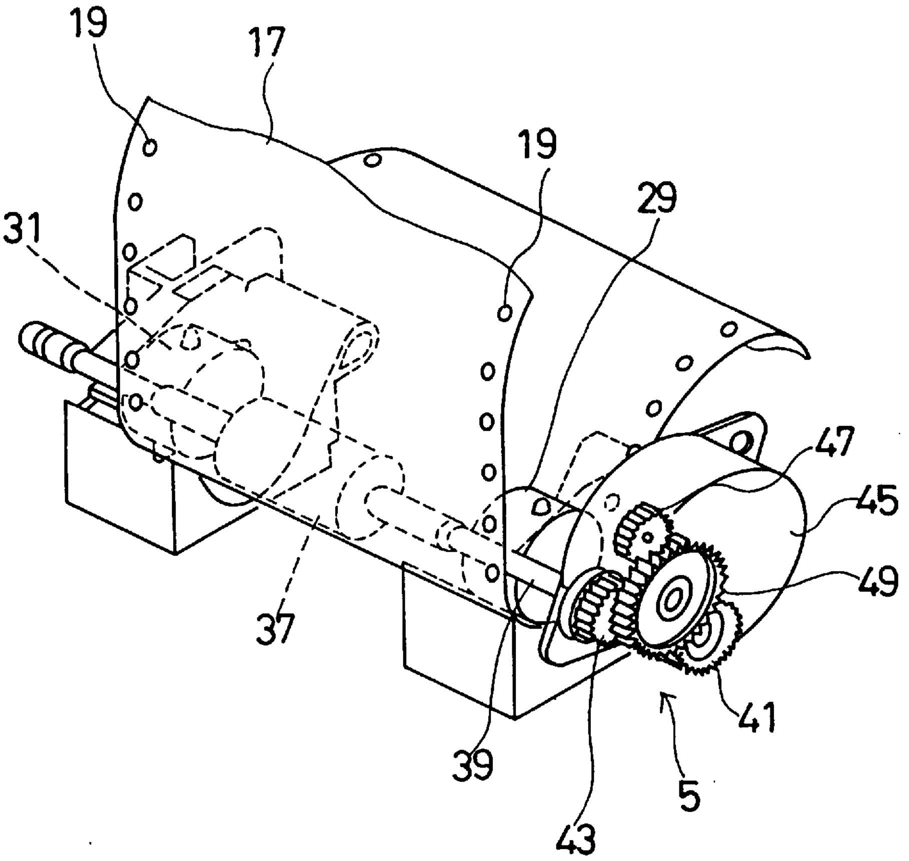
FIG. 4 is a perspective view showing a drive transmission mechanism of a paper feeding means of a printer according to the embodiment of the present invention.

The structure of the paper feeding means 5 and the printing means 7 will now be discussed. Firstly, in regard to the paper feeding means 5, there is a pair of paper feeding rollers 29 and 31 respectively provided on the right and the left as shown in FIG. 4. The paper feeding rollers 29 and 31 are integrally connected by means of a shaft 33, as shown in FIGS. 5 and 6. The paper feeding rollers 29 and 31 are respectively provided with a plurality of pins 35 on the outer cylindrical surfaces thereof, with predetermined regular spaces between the pins 35. Thus the pins 35 are engaged with the holes 19 of the paper 17, and hence, the paper 17 can be fed without fail. There is provided another roller other than the pair of paper feeding roller 29 and 31, namely a tension roller 37, which is fixed on a shaft 39. The tension roller 37 is forced to be in contact with an elastic member 40, with the paper 17 caught in between (as shown in FIGS. 5 and 6), so that the predetermined tension is applied to the paper 17 which is fed toward the printing means 7.

A gear 41 is fixed on one end of the shaft 33, and a gear 43 is also fixed on one end of the shaft 39. There is provided a driving motor (stepping motor) 45, and the rotation of the driving motor 45 is transmitted to a gear 47. The gear 47 is engaged with a gear 49, on which another unillustrated gear is fixed which has the same axis as that of the gear 49. The above-described gears 41 and 43 are engaged with this unillustrated gear. Consequently, when the driving motor 45 rotates, such a rotation is transmitted to the gears 47, 49, the unillustrated gear, and finally the gears 41 and 43, thus the pair of paper feeding rollers 29 and 31 rotate, and at the same time, the tension roller 37 also rotates. In the thus described structure, the paper 17 is fed toward the printing means 7.

Secondly, the printing means 7 is discussed. As shown in FIGS. 5 and 6, there is a platen 51, and at the opposite side of the platen 51 is a printing head 53. The platen 51 and the printing head 53 are facing with each other with the paper 17 inserted in between. The printing head 53 is mounted and fixed on a carriage 55, so that the carriage 55 can move in the direction perpendicular to the plane surface of drawings of FIGS. 5 and 6 (namely, in the direction parallel to the shafts 33 and 39). As the detailed description of movement of the carriage 55, there is a driving shaft 57 provided with a helicoid groove, and the driving shaft 57 is rotatively driven by a driving motor (not shown). On the other hand, there is a nut member (not shown) on the carriage 55, so that the nut member is movably engaged with the helicoid groove of the driving shaft 57. In the thus described structure, when the unillustrated driving motor rotates, the carriage 55 is actuated to move via the driving shaft 57 in order to move the printing head 53.

As shown in FIGS. 5 and 6, there is a tearing bar 59 beneath the paper outlet 23. When the operator wishes to cut the printed paper 17, the paper 17 is pulled along this tearing bar 59.

Further, there is a paper top detecting means 61 which detects the top of the paper 17. As shown in FIGS. 5 and 6, the paper top detecting means 61 is provided at the predetermined position to detect the paper 17 passing the paper feeding rollers 29 and 31 of the paper feeding means 5. The paper top detecting means 61 may be composed of any kind of device that is known per se, such as a mechanical device, or an optical device.

For reference, the mechanical device is used for the embodiment of the present invention.

The structure of a controlling means 63 will now be described with reference to FIG. 7. There is a CPU (central processing unit) 65, and various types of commands are input to the CPU 65 from a host computer 67 via an I/F 69. Then the CPU 65 reads the necessary information such as a setting condition, based on the command of the host computer 67, from a ROM 71, an EEPROM 73, and a RAM 75. Then the CPU 65 outputs the control signal, via a driver 77, to the above-mentioned paper feeding means 5 and the printing means 7 in order to execute the desired paper feeding operation and the printing operation. Further, the detected signal of the paper top detecting means 61 is input to the CPU 65, and the signals from the paper feeding switches 25 and 27 are also input to the CPU 65. The CPU 65 then outputs the control signal to the paper feeding means 5 via the driver 77.

Figure 7:
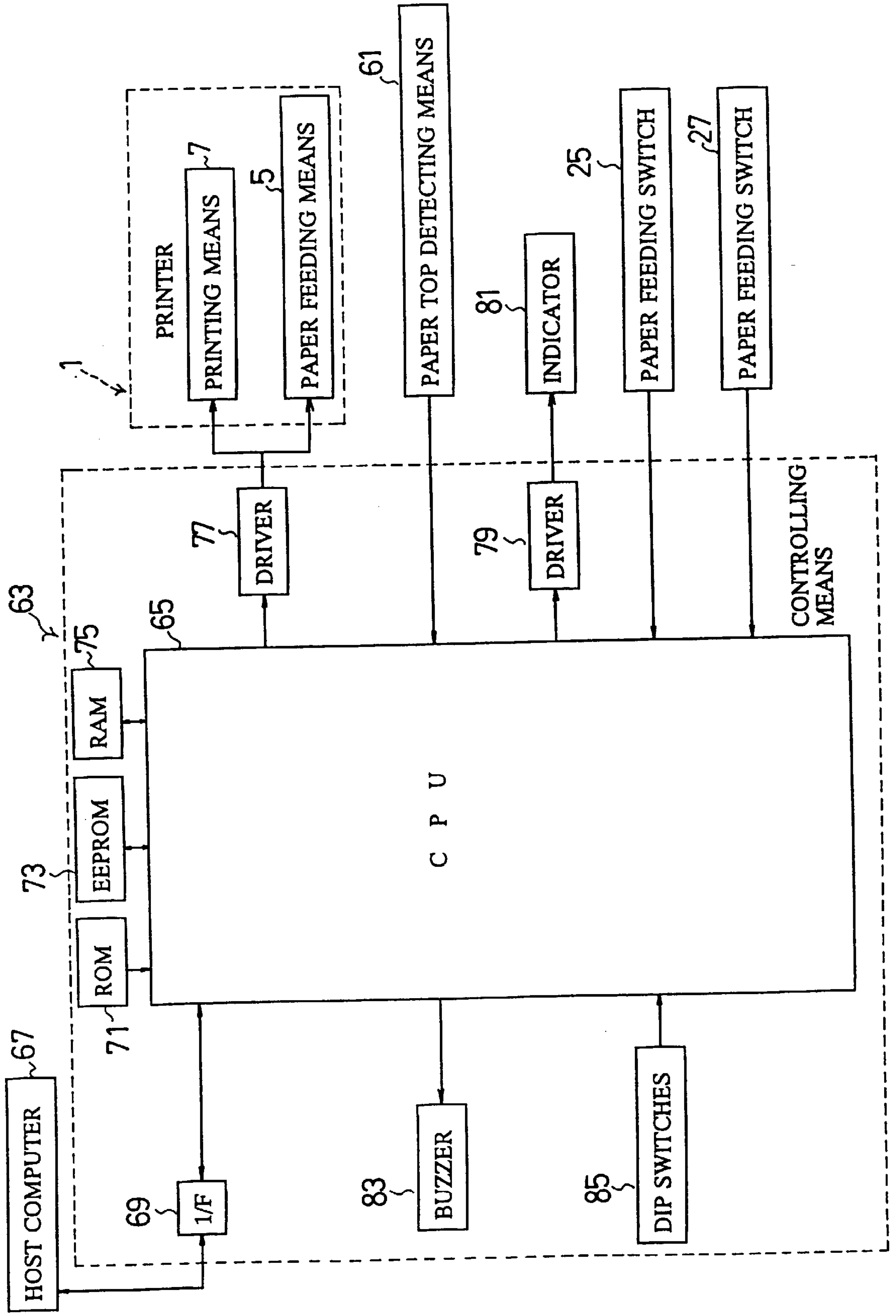
FIG. 7 is a block diagram showing a structure of a controlling means according to the embodiment of the present invention.

In FIG. 7, the reference numeral 79 indicates a driver, 81 indicates an indicator, 83 indicates a buzzer, and 85 indicates dip switches.

The following is the description of movement (operation) of the embodiment of the present invention mentioned above.

Figure 8:
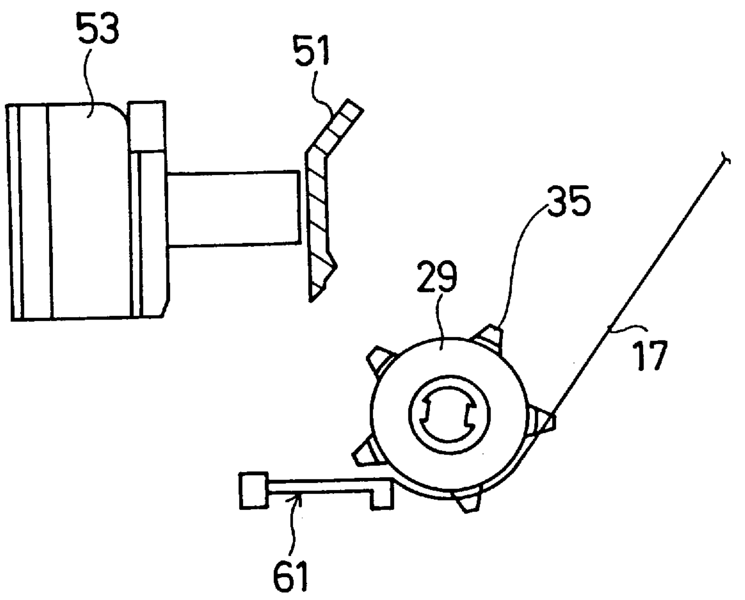
FIG. 8 is an elevational view showing movement of an apparatus according to the embodiment of the present invention.
Figure 9:
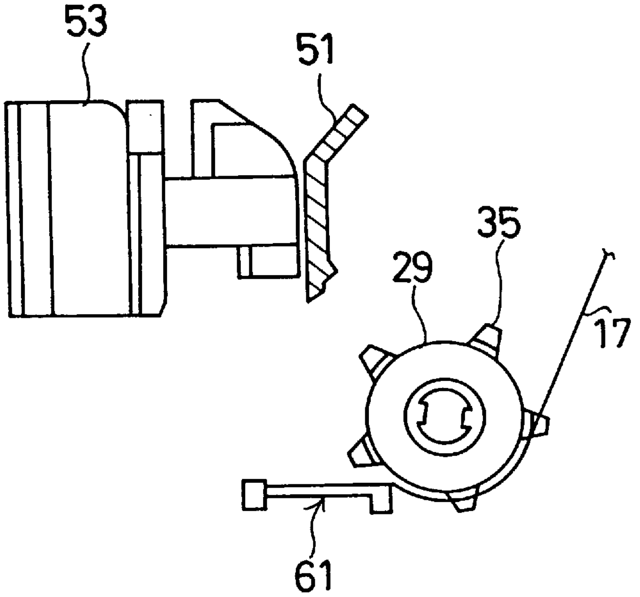
FIG. 9 is an elevational view showing movement of an apparatus according to the embodiment of the present invention.
Figure 12:
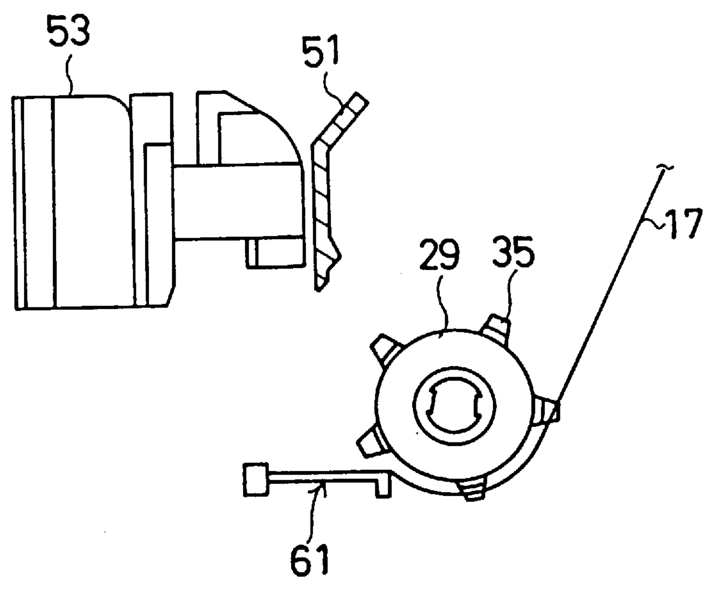
FIG. 12 is an elevational view showing movement of an apparatus according to the embodiment of the present invention.
Figure 13:
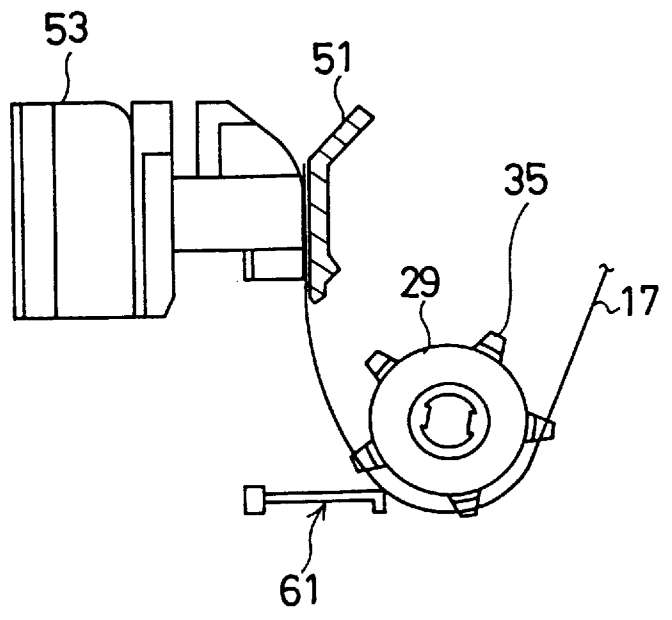
FIG. 13 is an elevational view showing movement of an apparatus according to the embodiment of the present invention.
Figure 14:
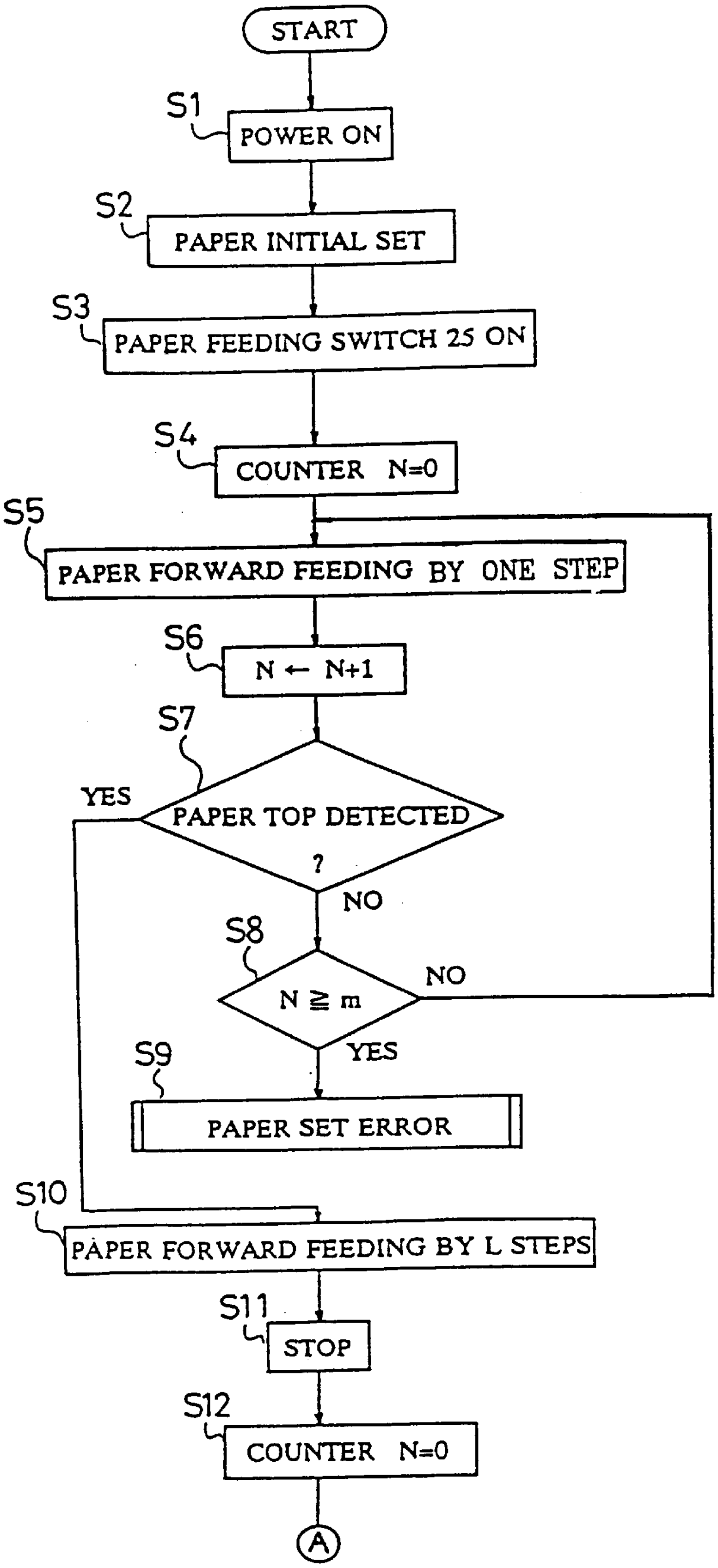
FIG. 14 is a flowchart showing steps of the top setting operation according to the embodiment of the present invention.
Figure 15:
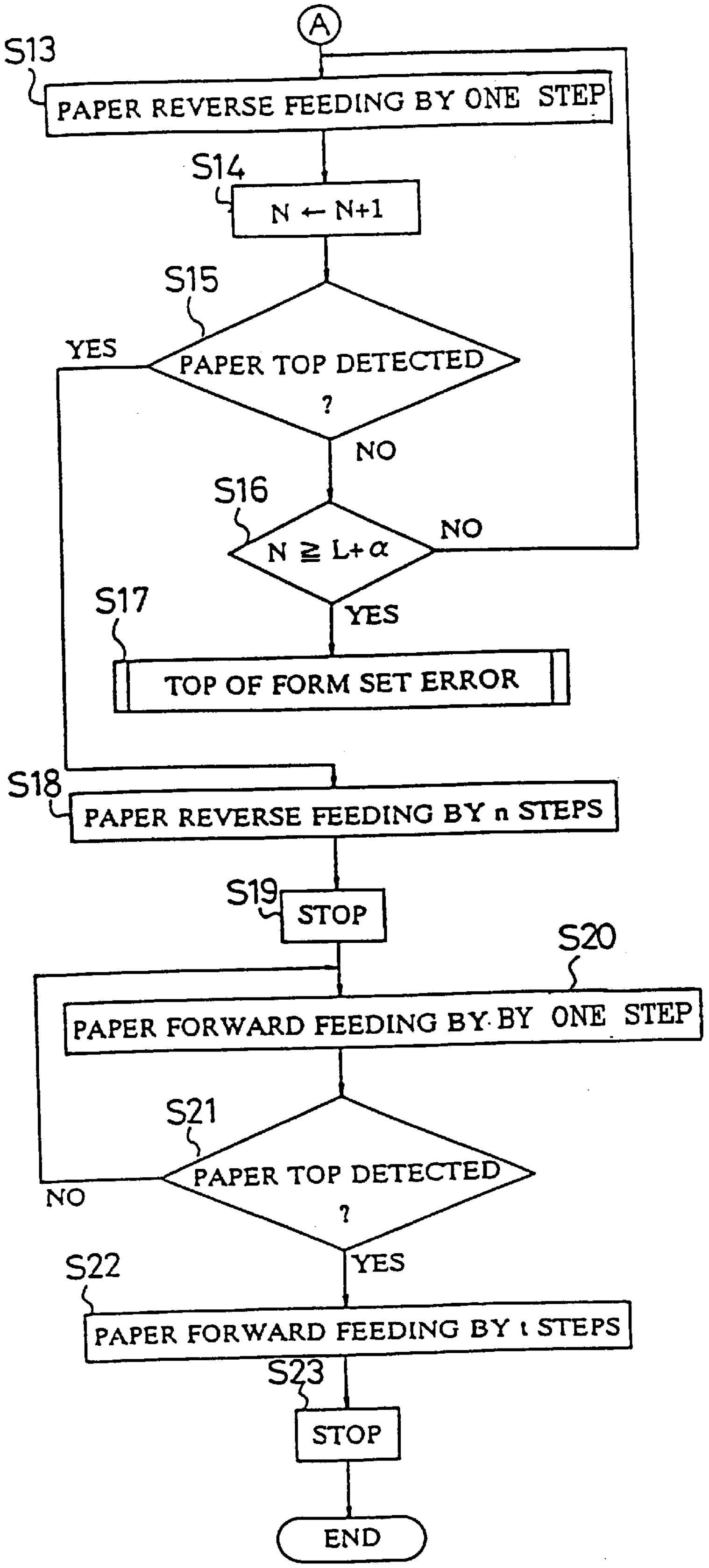
FIG. 15 is a flowchart showing steps of the top setting operation according to the embodiment of the present invention.
Figure 16:
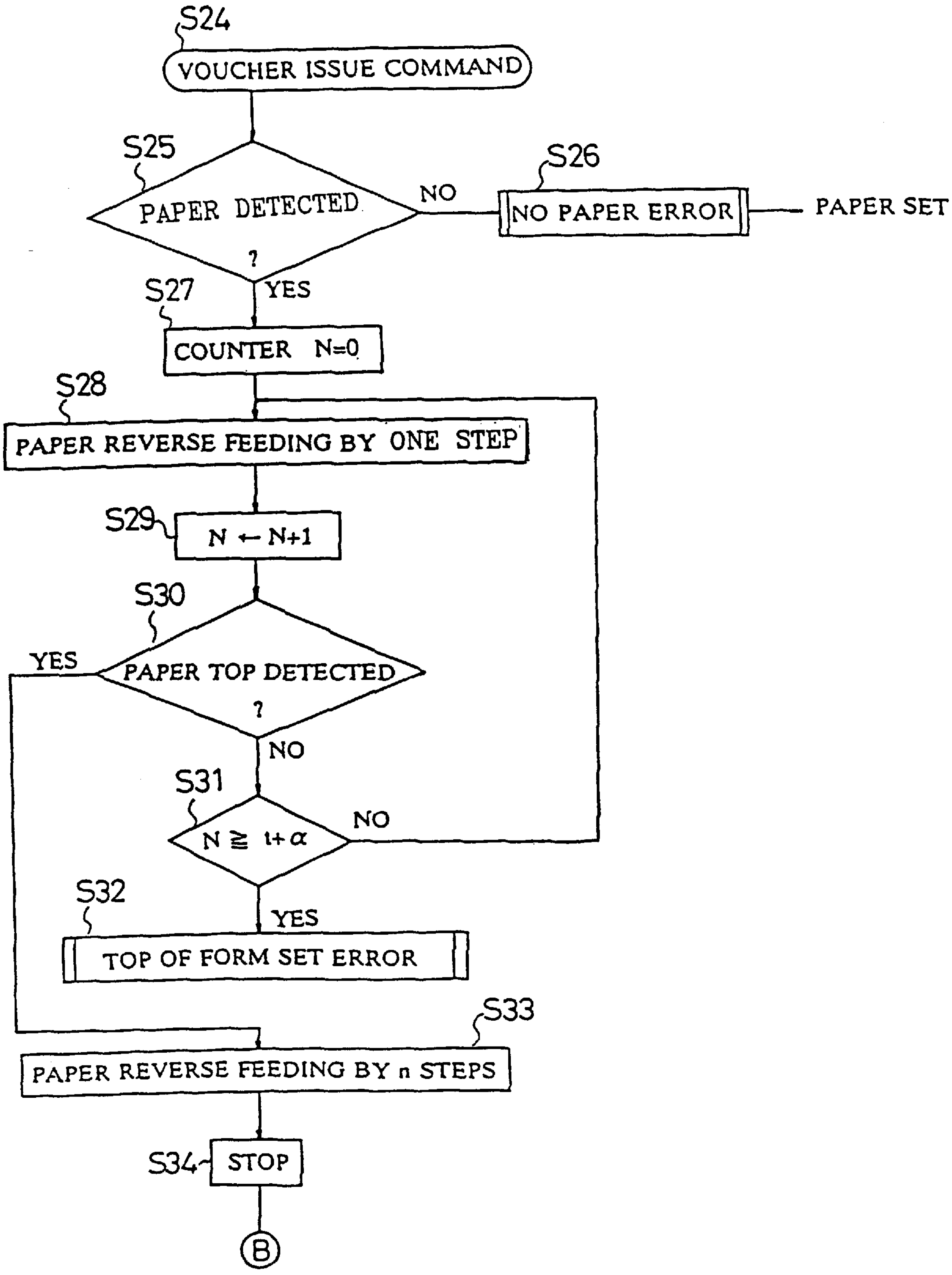
FIG. 16 is a flowchart showing steps of the top setting operation according to the embodiment of the present invention.

Firstly, the operations will be described with reference to the flowcharts shown in FIGS. 14 and 15, and the drawings in FIGS. 8 through 13. The electrical power is turned ON at step S1, and the paper 17 is set at step S2. The setting of the paper 17 at step S2 means that, the operator holds the end of the paper 17, inserts the paper 17 into the paper inlet 21, and puts the paper 17 on the paper feeding rollers 29 and 31 of the paper feeding means 5 (thus the holes 19 of the paper 17 are engaged with the pins 35 of the paper feeding rollers 29 and 31), which is shown in FIG. 8. Then the operator operates the paper feeding switch 25 at step S3. When the paper feeding switch 25 is turned ON, the counter (not shown) is cleared (set to “0”) at step S4, and the paper feeding means 5 executes the paper feeding stepwise at step S5. Then control proceeds to step S7 via step S6, at which whether or not the paper top detecting means 61 detects the top of the paper 17 is judged. When the paper top detecting means 61 does not detect the top of the paper 17, control proceeds to step S8 at which whether or not the number (value) of the paper feeding steps is beyond the value m is judged. If the number of the paper feeding steps is beyond the value m, it is judged to be a paper set error (step S9). In such an operation, the value m of the paper feeding steps should be the sufficient value, by which, the paper 17 is set, the top of the paper 17 reaches the paper top detecting means 61, and the paper top detecting means detects the top of the paper 17. If the number of steps is less than the value m, control is returned to step S5. Namely, the paper feeding is executed until the paper top detecting means 61 detects the top of the paper 17.

Figure 10:
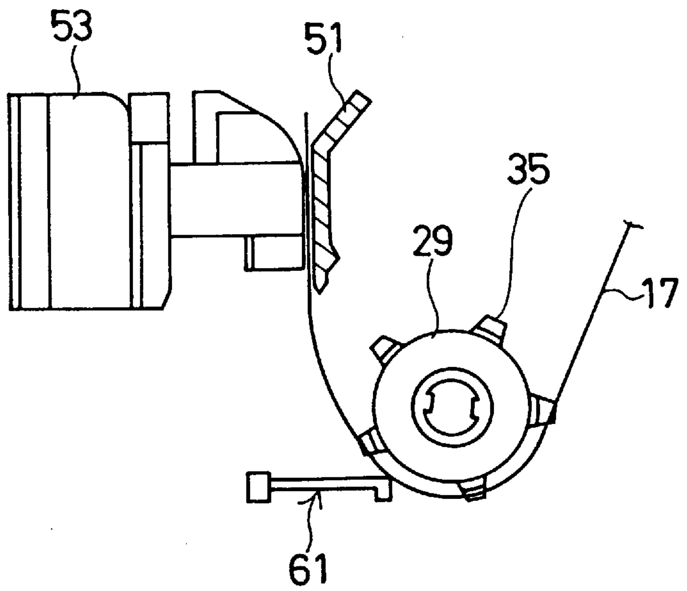
FIG. 10 is an elevational view showing movement of an apparatus according to the embodiment of the present invention.

When the paper top detecting means 61 detects the top of the paper 17 at step S7, control proceeds to step S10, and the paper feedings by the value L (L steps) are performed, which is shown in FIG. 10. Then the paper feeding stops at step S11, and the counter is reset (set to “0”) at step S12. In such a state, the top of the paper 17 is positioned adjacent to the printing means 7, so that the operator can visibly confirm the state of the paper 17. Since the paper 17 is once fed toward the printing means 7 (forward direction) by L steps, if the operator holds the paper 17, or if the operator pulls the paper 17 in the opposite direction of the paper feeding direction, such paper feedings by L steps can be a warning to these wrong operations of the operator. In addition, when the operator obliquely inserts the paper 17, and puts the paper 17 on the paper feeding means 5 in such an oblique state, the operator can visibly confirm the jamming of the paper 17.

Then control proceeds to step S13, at which the paper 17 is fed stepwise in the reverse direction. After that, control proceeds to step S15 via step S14, at which whether or not the paper top detecting means 61 is turned OFF is judged. that the paper top detecting means 61 is not turned OFF, and at the same time the number of the paper feeding steps is beyond the value L+α (step S16), it is judged to be a top of form set error (step S17). In the present case, the value L+α represents the sufficient number of the paper feeding steps, starting from the stop position at step S11, by which the top of the paper 17 reaches, and is detected by, the paper top detecting means 61.

Figure 11:
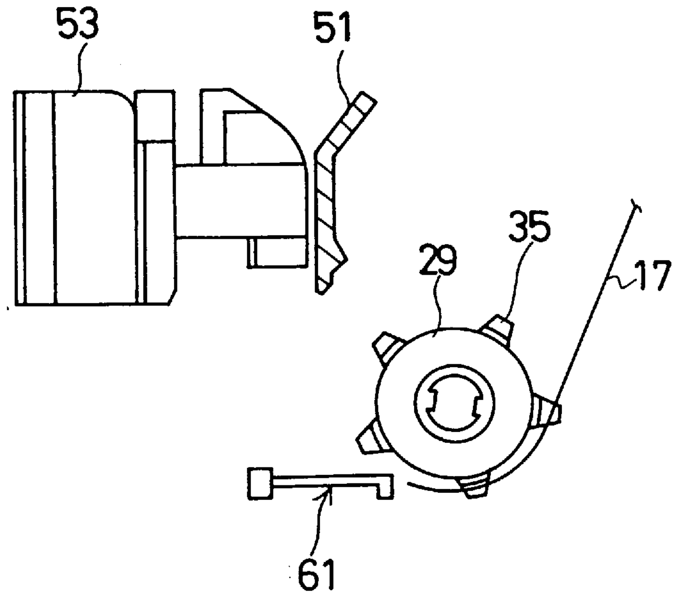
FIG. 11 is an elevational view showing movement of an apparatus according to the embodiment of the present invention.

On the other hand, if the paper top detecting means 61 is turned OFF at step S15, control proceeds to step S18, and the paper 17 is further fed in the reverse direction by additional n steps and stops, which is shown in FIG. 11. The n steps of paper feedings in the reverse direction are performed in order to absorb the backlash of the gear train which transmits the rotation as shown in FIG. 4. Then control proceeds to step S20 at which the paper 17 is fed in the forward direction stepwise, and whether or not the paper top detecting means 61 is turned ON is judged at step S21. Consequently, the paper feeding is carried out until the top of the paper 17 is detected by the paper top detecting means 61, which is shown in FIG. 12. After that, the paper feedings in the forward direction by t steps are carried out (step S22), and the paper feeding stops (step S23). The value t of the paper feeding steps corresponds to the number of steps starting from the position of the paper top detecting means 61 to the position at which the printing starts, and such a number of steps is specified according to the type of form of paper, or the state of “pre-printed” form, as illustrated in FIG. 13. In the thus executed operation, the top of form of the paper 17 is set at the predetermined position. Then the printing is carried out on the first form of the paper 17 based on the command to print thereon. After the printing is completed, the operator cuts and picks up the printed paper 17 by using the tearing bar 59.

In the above-mentioned operation, the operation starting from the setting of the paper 17 to the printing on the first form of the paper 17, is completed.

At the time of completion of printing as above discussed, the top of the paper 17 which should be printed secondly (the second form), has passed the printing means 7, and reaches the cutting position of the tearing bar 59. After that, if there is a command to print on the second form of voucher, the operation followed by this command is executed, which will be described below with reference to the flowcharts shown in FIGS. 16 and 17.

Firstly, the command to print on the second form of voucher is output at step S24. Then control proceeds to step S25 at which whether or not the paper top detecting means 61 is turned ON is judged. As above described, since the top of the second form of the paper 17 has passed the printing means 7 and reaches the cutting position by the tearing bar 59, the paper top detecting means 61 is usually turned ON. However, if there is no remaining paper 17, the paper top detecting means 61 is turned OFF, and control proceeds to step S26 to judge to be a no-paper error, and hence the operator sets the paper 17.

When the paper top detecting means 61 is turned ON, the counter is reset (set to "0") at step S27, and control proceeds to step S28 at which the paper 17 is fed stepwise in the reverse direction. After that, control proceeds to step S30 via step S29, at which whether or not the paper top detecting means 61 is turned OFF is judged. Namely, the paper 17 is fed in the reverse direction until the top of the paper 17 passes the detecting position of the paper top detecting means 61. Further, whether or not the number of the paper feeding steps is beyond the value $t+\alpha$ is judged at step S31, and if beyond the value $t+\alpha$, it is judged to be a top of form set error (step S32). In the present case, the value $t+\alpha$ represents the sufficient number of the paper feeding steps, starting from the stop position at step S23, by which the top of the paper 17 reaches, and is detected by, the paper top detecting means 61. If the paper top detecting means 61 is turned OFF at step S30, control proceeds to step S33, and the paper 17 is further fed in the reverse direction by additional n steps and stops at step S34.

Figure 17:
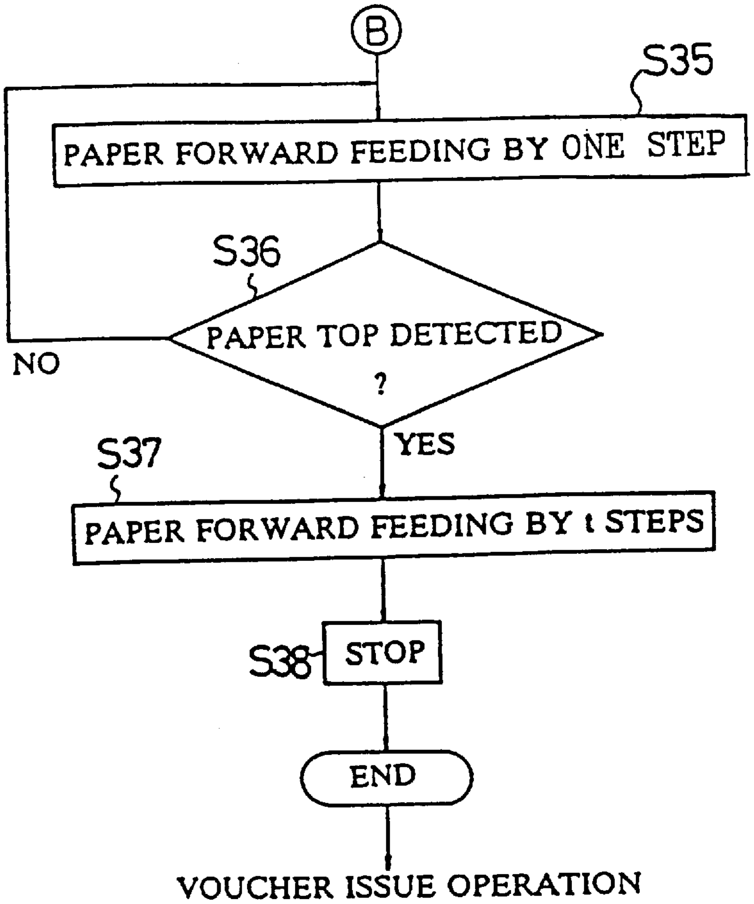
FIG. 17 is a flowchart showing steps of the top setting operation according to the embodiment of the present invention.
Figure 18:
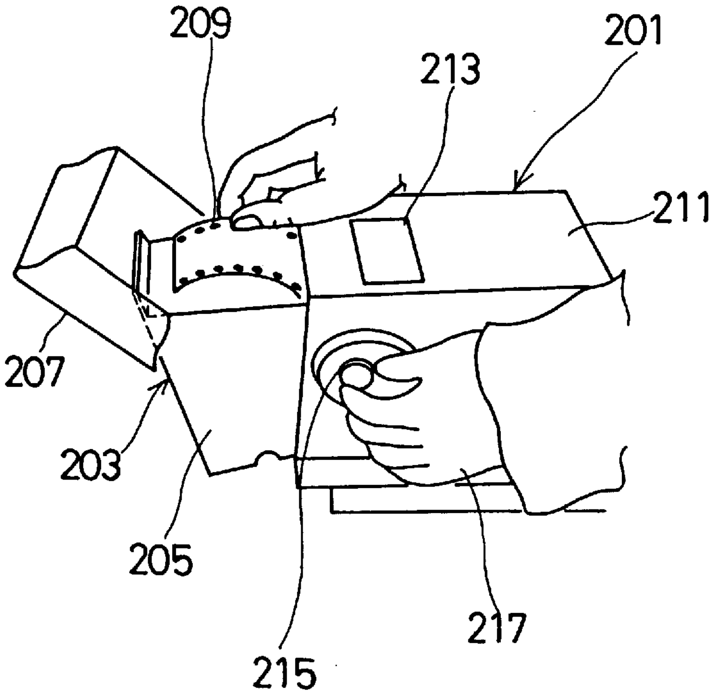
FIG.18 (PRIOR ART)
FIG. 18 is a perspective view showing a prior art in which the paper is positioned in a deviated state due to operation of an operator.
Figure 19:
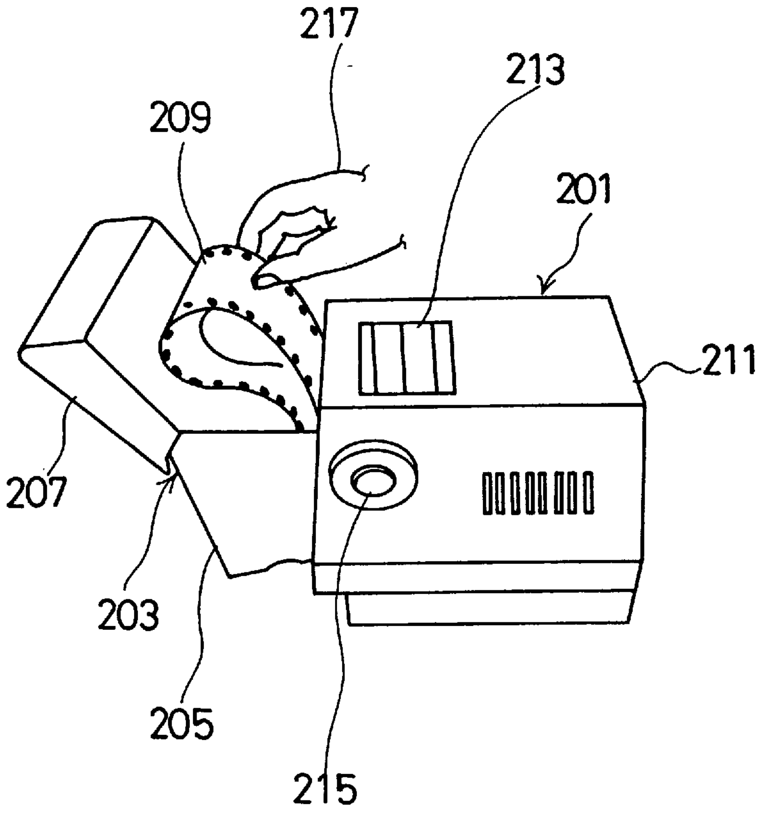
FIG.19 (PRIOR ART)
FIG. 19 is a perspective view showing the prior art in which the paper is positioned in a deviated state due to operation of an operator.
Figure 20:
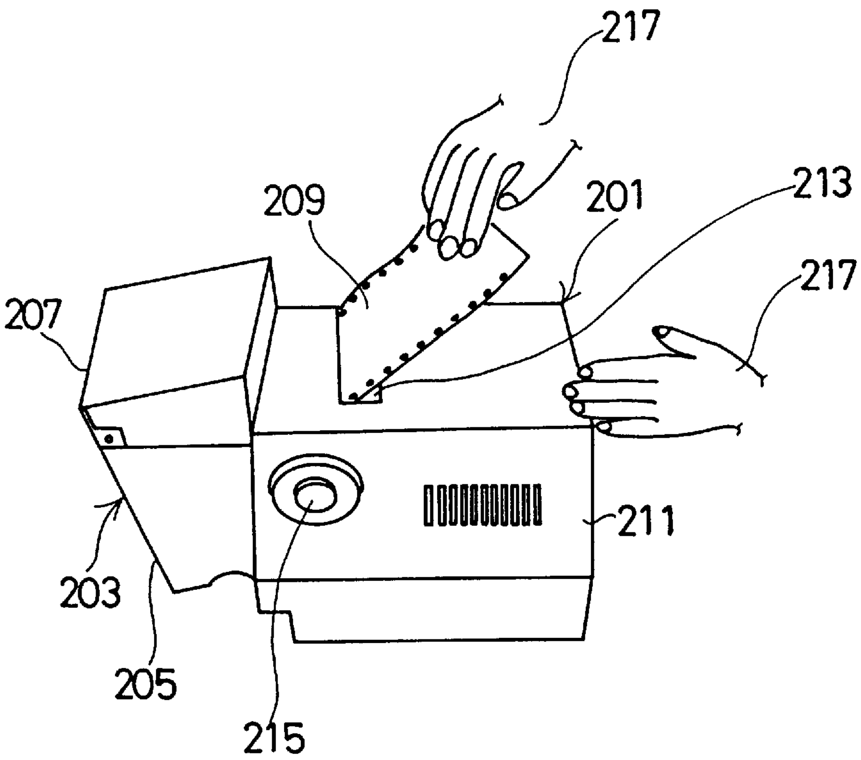
FIG.20 (PRIOR ART)
FIG. 20 is a perspective view showing the prior art in which the paper is positioned in a deviated state due to operation of an operator.
Figure 21:
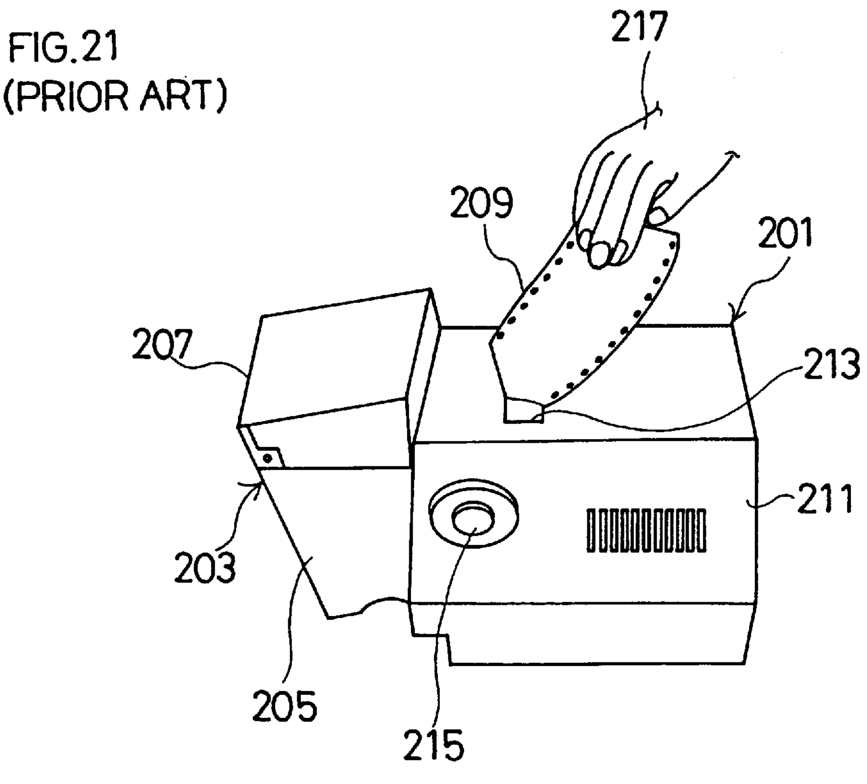
FIG.21 (PRIOR ART)
FIG. 21 is a perspective view showing the prior art in which the paper is positioned in a deviated state due to operation of an operator.
Figure 22:
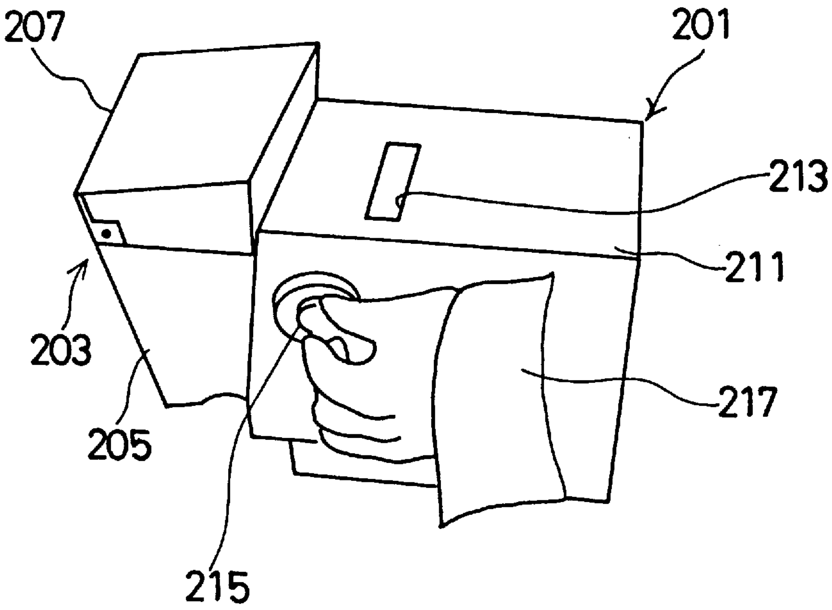
FIG. 22 (PRIOR ART)
FIG. 22 is a perspective view showing the prior art in which the paper is positioned in a deviated state due to operation of an operator.

After that, as shown in FIG. 17, control proceeds to step S35 at which the paper 17 is fed in the forward direction stepwise, and whether or not the paper top detecting means 61 is turned ON is judged at step S36. Consequently, the paper feeding is carried out in the forward direction until the top of the paper 17 is detected by the paper top detecting means 61. When the paper top detecting means 61 is confirmed to be turned ON, the paper feedings in the forward direction by t steps are carried out (step S37), and the paper feeding stops at that position (step S38). Thus the top of the second form of the paper 17 is set at the predetermined position. Consequently, when the printing is carried out on the following form (namely, the second form) of the paper 17, the paper 17 is once fed in the reverse direction until the top of the second form of the paper 17 passes the detecting position of the paper top detecting means 61, and after that, like the case of the setting of top of the first form of the paper 17, the top of the second form of the paper 17 is set at the predetermined position, through detecting of top of the paper and paper feeding by a predetermined amount (number of steps).

The present embodiment has the following advantages.

Firstly, during the setting of the paper 17, when the deviation of position of paper occurs due to the wrong operation of the operator, the amendment of such a deviated position can be made so that top of paper can be accurately set at a predetermined position. For example, there may be a case that, when the operator sets the paper 17 which is then automatically fed by the paper feeding means 5, the operator mistakenly holds and pulls the paper 17 in the opposite direction of the paper feeding. At that time, after such a wrong operation, the paper 17 is once fed in the reverse direction so that the paper top detecting means 61 can detect the top of the paper 17 again. Then the top of paper is set at the predetermined position through paper feeding by a predetermined amount. Consequently, during the setting of paper, if there is a deviation of position of paper due to the wrong operation of the operator, such a deviation will not affect the setting of top of form of paper.

Secondly, when there is a command to print the next voucher, there may be a case, for example, that the operator mistakenly pulls the next form of the paper 17 during cutting of the printed form of paper 17. At that time, the paper 17 is once fed in the reverse direction so that the paper top detecting means 61 can detect the top of the paper 17 again, then the top of paper is set at the predetermined position through paper feeding by a predetermined amount. Consequently, there is no possibility that the deviation of the position of top of paper may occur due to the above mentioned deviation of position through cutting of paper.

As above described, since the top of paper is surely set at the predetermined position, the quality of printing may improve. Especially, during printing on the paper 17 that is "pre-printed", the printing positions are minutely specified, and a slight deviation of position seriously affects the quality of printing. Even in such a case, according to the present embodiment, it is possible to print on the accurate printing positions.

During setting of paper, since the paper 17 is once fed in the forward direction by L steps, the operator can be warned if the operator holds the paper 17 or pulls the paper 17 in the direction opposite to the paper feeding. Further, the operator can also visibly confirm the jamming of paper when the operator obliquely inserts the paper 17 by mistake and puts the paper 17 on the paper feeding means 5 in such an oblique state.

In addition, during paper feeding in the reverse direction, the present embodiment is designed to absorb the backlash of the gear train which serves as the rotation transmission mechanism. Consequently, there is no possibility that the deviation of position may occur due to backlash of the gear train.

It is clear that the present invention is not limited to the embodiment as described above.

The structure of the printer shown in the present embodiment is solely an example of the present invention, and the present invention can be applicable to various types of printers.

Although the description has already been made, the paper top detecting means is not limited to the mechanical device, and any type of optical devices that is known per se can be used.

What is claimed is:

1. A printer, comprising:

a printing means for printing on paper;

a paper storage for storing said paper;

a paper feeding means for feeding said paper;

a controlling means for controlling said printing means and said paper feeding means; and a paper top detecting means for detecting a paper top of said paper fed by said paper feeding means;

wherein said paper feeding means includes:

a first paper forward feeding means for feeding said paper to a printing position;

a paper reverse feeding means for feeding said paper, from said printing position, in a reverse direction toward said paper storage until reaching a detecting position of said paper top detecting means, and further for feeding said paper in said reverse direction by an additional amount; and a second paper forward feeding means for feeding said paper, which has been fed in the reverse direction by said paper reverse feeding means, in a forward direction toward said printing means until reaching said detecting position of said paper top detecting means, and further for feeding said paper in said forward direction by an additional amount, thereby setting the paper top at a predetermined position.

2. The apparatus as claimed in claim 1, wherein said controlling means includes:

a judging means for determining a top of form set error when said paper is not detected by said paper top detecting means when a sufficient amount of reverse feeding has been executed by said paper reverse feeding means so as to pass the detecting position.

3. The apparatus as claimed in claim 1, wherein said additional amount during paper feeding in a reverse direction by said paper reverse feeding means is an amount which can absorb backlash of a gear train of said paper feeding means.

4. The apparatus as claimed in claim 1, wherein said paper is continuous form paper.

5. A printer, comprising:

a printing means for printing on paper;

a paper storage for storing said paper;

a paper feeding means for feeding said paper;

a controlling means for controlling said printing means and said paper feeding means; and a paper top detecting means for detecting a paper top of said paper fed by said paper feeding means;

wherein said paper feeding means includes:

a first means for executing forward feeding of said paper until reaching a detecting position of said paper top detecting means, and further for forwardly feeding said paper by an amount to set said paper at a desired position relative to a paper outlet of said printer;

a means for executing reverse feeding of said paper, which has been fed in a forward direction by said first means for executing forward feeding, until reaching said detecting position of said paper top detecting means, and further for reversely feeding said paper by an additional amount; and a second means for executing forward feeding of said paper, which has been fed in a reverse direction by said means for executing reverse feeding, until reaching said detecting position of said paper top detecting means, and further for forwardly feeding said paper by an amount to set the paper top at a desired position relative to said printing means.

6. The apparatus as claimed in claim 5, wherein said controlling means includes:

a judging means for determining a paper set error when said paper top detecting means does not detect the top of said paper in spite that a sufficient amount of forward feeding has been executed by said first means so as to reach the detecting position.

7. The apparatus as claimed in claim 5,, wherein said amount fed during paper feeding in a forward direction by said first means is an amount so that an operator can visible confirm said paper.

8. The apparatus as claimed in claim 5, wherein said controlling means includes:

a judging means for determining a top of form set error when said paper is not detected by said paper top detecting means when a sufficient amount of reverse feeding has been executed by said paper reverse feeding means so as to pass the detecting position.

9. The apparatus as claimed in claim 5, wherein said additional amount during paper feeding in a reverse direction by said paper reverse feeding means is an amount which can absorb backlash of a gear train of said paper feeding means.

10. The apparatus as claimed in claim 5, wherein said paper is continuous form paper.

11. A printer for setting a position of a page of continuous form paper, said page having a top, comprising:

a print head for printing on said continuous form paper;

a continuous form paper feeder for feeding said continuous form paper;

a controller for controlling said print head and said paper feeder to perform a printing on said page of said continuous form paper, a separator for allowing a user to separate said printed page from said continuous form paper; and a top of form setting controller for setting a position of a next page of said continuous form paper based on a top of the next page during a period of time from when said user separates said printed page from said continuous form paper to a start of a printing on the next page.

12. An apparatus as in claim 11, further comprising:

a paper top detector disposed at a predetermined location along a paper transport path within said printer, wherein said controller controls said continuous form paper feeder to move a top of said page based on paper top signals issued from said paper top detector.

13. An apparatus as in claim 12, wherein said paper top detector includes one of an optical detector and a mechanical detector.

14. An apparatus as in claim 11, further comprising:

a paper top detector disposed at a predetermined location along a paper transport path within said printer, wherein said continuous form paper feeder includes means for feeding said continuous form paper in said reverse direction until said paper top detector detects said top of said page and means for subsequently feeding said top of said page in said forward direction a predetermined amount past said paper top detector, thereby initially setting said position of said page.

15. An apparatus as in claim 14, wherein, after said continuous form paper feeder initially sets said position of said page, said continuous form paper feeder includes:

means for feeding said continuous form paper in said reverse direction until said paper top detector detects said top of said page;

means for subsequently feeding said top of said page in said reverse direction a predetermined amount past said paper top detector;

means for subsequently feeding said continuous form paper in said forward direction until said paper top detector detects said top of said page; and means for subsequently feeding said top of said page in said forward direction a predetermined amount past said paper top detector, thereby setting said position of said page.

16. An apparatus as in claim 11, wherein said continuous form paper feeder comprises at least one roller, each of said at least one roller including pins for engaging said continuous form paper.

17. An apparatus as in claim 11, wherein said controller comprises:

a central processing unit;

at least one memory unit connected to said central processing unit; and a warning device, connected to said central processing unit, including at least one of a visible warning device and an audible warning device.

18. The apparatus as claimed in claim 11, wherein said separator is a tear bar.

19. A printer for setting a position of a page of a continuous form paper, said page having a top, comprising:

a print head for printing on said continuous form paper;

a continuous form paper feeder for feeding said continuous form paper;

a controller for controlling said print head and said paper feeder to perform a printing on said page of said continuous form paper, a separator for allowing a user to separate said printed page from said continuous form paper; and a top of form setting controller for setting a position of a page after feeding a top of the page of the continuous form paper to a place visually perceptive by an operator when the continuous form paper is set at a printing position.

20. An apparatus as in claim 19, further comprising:

a paper top detector disposed at a predetermined location along a paper transport path within said printer, wherein said controller controls said continuous form paper feeder to move a top of said page based on paper top signals issued from said paper top detector.

21. An apparatus as in claim 20, wherein said paper top detector includes one of an optical detector and a mechanical detector.

22. An apparatus as in claim 19, further comprising:

a paper top detector disposed at a predetermined location along a paper transport path within said printer, wherein said continuous form paper feeder includes:

means for feeding said continuous form paper in said reverse direction until said paper top detector detects said top of said page; and means for subsequently feeding said top of said page in said forward direction a predetermined amount past said paper top detector, thereby initially setting said position of said page.

23. An apparatus as in claim 22, wherein, after said continuous form paper feeder initially sets said position, said continuous form paper feeder includes:

means for feeding said continuous form paper in said reverse direction until said paper top detector detects said top of said page;

means for subsequently feeding said top of said page in said reverse direction a predetermined amount past said paper top detector;

means for subsequently feeding said continuous form paper in said forward direction until said paper top detector detects said top of said pages; and means for subsequently feeding said top of said page in said forward direction a predetermined amount past said paper top detector, thereby setting said position of said page.

24. An apparatus as in claim 19, wherein said continuous form paper feeder comprises at least one roller, each of said at least one roller including pins for engaging said continuous form paper.

25. An apparatus as in claim 19, wherein said controller comprises:

a central processing unit;

at least one memory unit connected to said central processing unit; and a warning device, connected to said central processing unit, including at least one of a visible warning device and an audible warning device.

26. The apparatus as claimed in claim 19, wherein said separator is a tear bar.

27. A method for detecting a paper orientation error in a printer, comprising steps of:

feeding paper into said printer;

determining whether a top of the paper has reached a detecting position when said paper has been fed into said printer by a first predetermined amount; and if so feeding the paper in a forward direction by a second predetermined amount, the top of the paper, after being fed by said second predetermined amount, being located at a first position relative to a print head;

feeding the paper in a reverse direction from the first print position by a third predetermined amount;

feeding the paper in the forward direction until the top of said paper is determined to be at the detecting position; and feeding the paper in the forward direction until the top of said sheet is at a second position relative to said print head.

28. A method as claimed in claim 27, wherein, in said determining step, if the top of the paper is not at said detecting positioning, providing an indication of a paper set error.

29. A method as claimed in claim 27, further comprising after the step of feeding the paper in a reverse direction:

determining whether the top of said paper is at the detecting position, and if so feeding the paper in the reverse direction by a fourth predetermined amount, and if not, providing an indication of a top of form set error.

30. A method as claimed in claim 29, wherein the fourth predetermined amount is an amount which can absorb backlash of a gear train of a paper feeding means of said printer.

31. A method as claimed in claim 27, wherein said first print position is a position at which an operator may visibly detect whether a top of said paper is skewed.

32. A method as claimed in claim 27, wherein said first print position is same as said second print position.

33. A method as claimed in claim 27, wherein said forward direction is a direction towards said print head and said reverse direction is a direction towards a paper storage of said printer.

34. The apparatus as claimed in claim 27, wherein the second position is a printing position.

* * * * *